US012173544B2

(12) United States Patent
Reed

(10) Patent No.: US 12,173,544 B2
(45) Date of Patent: Dec. 24, 2024

(54) DOOR OPENING SYSTEM AND METHOD

(71) Applicant: University of South Florida, Tampa, FL (US)

(72) Inventor: Kyle Brandon Reed, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 80 days.

(21) Appl. No.: 17/571,249

(22) Filed: Jan. 7, 2022

(65) Prior Publication Data

US 2022/0213727 A1 Jul. 7, 2022

Related U.S. Application Data

(60) Provisional application No. 63/199,551, filed on Jan. 7, 2021.

(51) Int. Cl.

| | |
|---|---|
| ***E05F 11/54*** | (2006.01) |
| ***E05B 1/00*** | (2006.01) |
| ***E05F 13/02*** | (2006.01) |

(52) U.S. Cl.
CPC ............ *E05F 11/54* (2013.01); *E05B 1/0015* (2013.01); *E05F 13/02* (2013.01)

(58) Field of Classification Search
CPC . E05F 13/02; E05F 13/00; E05F 11/54; E05F 1/00; E05B 1/0015; E05Y 2201/688
See application file for complete search history.

(56) References Cited

U.S. PATENT DOCUMENTS

| | | | | |
|---|---|---|---|---|
| 1,875,965 A * | 9/1932 | Waters | E05C 17/446 | 16/44 |
| 1,905,921 A * | 4/1933 | Litchfield | E05F 13/00 | 292/262 |
| 4,162,592 A * | 7/1979 | Taniwaki | E05F 11/54 | 292/199 |
| 4,569,546 A * | 2/1986 | Howard | E05B 53/001 | 292/225 |
| 4,911,508 A * | 3/1990 | Tillman | E05F 11/54 | 312/319.9 |
| 5,469,661 A * | 11/1995 | Finkelstein | E05F 11/54 | 49/276 |
| 6,270,175 B1 * | 8/2001 | Sfeir | F25D 23/028 | 312/319.9 |
| 9,163,438 B2 * | 10/2015 | Mackay | E05C 17/44 | |
| 9,295,302 B1 | 3/2016 | Reed et al. | | |

(Continued)

FOREIGN PATENT DOCUMENTS

| | | | | |
|---|---|---|---|---|
| CH | 717826 A2 * | 3/2022 | E05F 1/10 |
| EP | 2644814 A1 * | 10/2013 | E05F 13/02 |
| WO | WO-2012153852 A1 * | 11/2012 | E05F 1/02 |

OTHER PUBLICATIONS

Machine translation of EP2644814A1.*

(Continued)

*Primary Examiner* — Marcus Menezes
(74) *Attorney, Agent, or Firm* — Quarles & Brady LLP

(57) ABSTRACT

A door opener for a door includes a frame coupled to the door and a wheel rotatably supported by the frame. The wheel, including its position relative to the door and frame, as well as its shape, are configured to convert a downward force applied by a user's foot into a lateral force that opens the door by rotating the wheel in contact with the floor.

20 Claims, 10 Drawing Sheets

(56) References Cited

U.S. PATENT DOCUMENTS

| | | | | |
|---|---|---|---|---|
| 11,692,384 | B2 * | 7/2023 | Jaroff | E05F 11/54 49/324 |
| 2019/0048638 | A1 * | 2/2019 | Janda | E05F 11/22 |
| 2020/0071962 | A1 * | 3/2020 | Markway | E05B 1/0046 |
| 2022/0010593 | A1 * | 1/2022 | McDaniel | E05F 11/54 |
| 2022/0349210 | A1 * | 11/2022 | Hawkinson | E05B 17/0033 |

OTHER PUBLICATIONS

Handzic et al., Kinetic Shapes: Analysis, Verification, and Applications, Journal of Mechanical Design, 2014, 136(6): 061005, pp. 1-8.

Kim et al., Pop & Go Detailed Design Report, May 7, 2018, 14 pages.

StepNpull Black Finish, https://www.StepNpull.com/products/StepNpull-black-finish, Copyright 2022 StepNpull.com, 1 page.

* cited by examiner

DOOR OPENING SYSTEM AND METHOD

CROSS-REFERENCE TO RELATED APPLICATIONS

This application claims priority to U.S. Provisional Patent Application No. 63/199,551, filed Jan. 7, 2021, and entitled "Foot-Powered Door Opener with Force Assist from Body-weight," which is incorporated by reference herein in its entirety.

STATEMENT REGARDING FEDERALLY SPONSORED RESEARCH

Not applicable.

TECHNICAL FIELD

This disclosure is related to a system and method for opening doors. More specifically, the system and method allows a user to use their own body weight to assist in opening a door.

BACKGROUND

Generally, doors can be opened by a user pulling on a handle of a door. However, in some cases, in particular, public places such as restrooms, users may be reluctant to, or prefer not to, contact these high-touch surfaces with their bare hands. Accordingly, doors can be provided with structures and other mechanical devices that allow for hands-free or touchless opening of doors.

For example, some known devices allow a user to open a door using only their foot. Such devices typically include a bracket that is attached to a lower portion of a door (e.g., below a handle of the door). The bracket is configured to allow a user to use their foot to apply a force to the bracket to open the door. More specifically, a bracket can include a platform wherein a user can place their foot on the bracket, and the user can simultaneously apply downward and lateral forces to the bracket to cause the door to open. However, such brackets require that a user have a minimum level of coordination, balance, and strength in order to safely open the door using the bracket. Consequently, some individuals may find it difficult or impossible to use these types of hands-free opening systems. Additionally, when such devices are used, the downward force applied by the user must be counteracted by the hinges of the door, leading to damage of the hinges over time.

Some other known systems can help to alleviate some of these issues. In particular, another hands-free door opening device uses a platform that is mounted to the floor and or the wall adjacent to the doors, which engages a ramped bracket attached to a door. A user can apply a downward force to the platform to move the platform downward towards the floor. As the platform moves downward, the contact with the ramped bracket causes the door to be opened. While such a system eliminates the need for a user to physically apply a lateral force at the same time that they are pressing downward, these systems can only open a door to a limited extend, as the ramped brackets must become larger to provide a greater degree of opening. Accordingly, a user must typically touch the door with their hand or another portion of their body to open the door a sufficient amount to pass through. Moreover, these systems can only be used where there is sufficient space around the door to mount the platform.

In view of the above, a need exists for an improved hands-free door opening system. In particular, it is desirable to provide a system that can be supported only by a door, reduce excessive and unfavorable loading on the door, which can reduce longevity, and that can allow a user to use their own weight to assist in opening the door. The discussion above is merely provided for general background information and is not intended to unduly limit the scope of the claimed subject matter.

SUMMARY

Aspects of the present disclosure can provide for a door opening system that can allow for hands-free opening of doors and that can allow a user to advantageously use their own weight to open the door.

According to one aspect of the present disclosure, a door opener for opening a door is provided. The door opener can include a frame that is coupled to the door and a wheel that is rotatably supported by the frame. The wheel can be configured to convert a downward force applied to the frame by a user into a lateral force to open the door.

In some aspects, a wheel can be configured to move between an unloaded configuration, in which the wheel is elevated above the ground, and a loaded configuration, in which the wheel is in contact with the ground. The downward force can cause the wheel to move between the unloaded configuration and the loaded configuration, and to rotate in the loaded configuration to open the door. Relatedly, the frame can include a base plate configured to couple to the door and a support arm movably coupled to the base plate. The support arm can be configured to rotatably support the wheel so that the wheel moves with the support arm between the unloaded configuration and the loaded configuration. More specifically, the support arm can be pivotally coupled to the base plate. Further, the frame can also include a foot pedal coupled to the support arm. The foot pedal can be configured to support a foot of a user to allow the user to apply the downward force.

In some aspects, a frame can further include a first resilient member extending between the support arm and at least one of the door and the base plate. The first resilient member can be configured to move the wheel from the loaded configuration to the unloaded configuration when the downward force is removed. The first resilient member can be configured as a tension spring.

In some aspects, the support arm can include an axle that is received by the wheel and the wheel can rotate about the axle. A second resilient member can extend between the support arm and the wheel. The second resilient member can be configured to rotate and retain the wheel in an initial rotational position when the wheel is in the unloaded configuration. The second resilient member can be configured as a torsion spring.

In some aspects, at least a portion of the wheel can be configured as a kinetic shape having a radius that varies as a function of an angular position of the wheel. In particular, at least a first portion of a wheel can be configured as an Archimedes spiral.

According to another aspect of the present disclosure, a door opening assistance device for opening a door is provided. The door opening assistance device can include a base plate, a support arm, and wheel. The base plate can be configured to couple to a door. The support arm can be pivotally coupled to the base plate. The wheel can be rotatably supported by the support arm. The wheel can be configured to pivot with the support arm relative to the base plate between an unloaded configuration, in which the wheel is elevated above the ground, and a loaded configuration, in which the wheel is in contact with the ground. The wheel can be shaped to rotate in the loaded configuration in response to a downward force applied by a user to open the door. In some aspects, the downward force applied by the user can cause the support arm to pivot from the unloaded configuration to the loaded configuration.

According to yet another aspect, a method of opening a door using a door opening assistance device is provided. The method can include the step of applying a downward force to a frame of the door opening assistance device. The door opening assistance device can be coupled to the door and can be configured to move a wheel from an unloaded configuration, in which the wheel is elevated above a support surface, to a loaded configuration, in which the wheel is in contact with the support surface in an initial rotational position. The method can further include the step of continuing to apply the downward force to cause the wheel to rotate away from the initial rotational position, along a curved surface of the wheel. The rotation of the wheel can result in a lateral force that opens the door.

In some aspects the method can further include the step of applying a secondary lateral force to the frame to continue opening the door once the wheel has rotated to a final rotational position. The wheel may stop rotating after reaching the final rotational position.

In some aspects, the method can further include the step of removing the downward force to allow the wheel to move back to the unloaded configuration and to rotate back to the initial rotational position.

This Summary and the Abstract are provided to introduce a selection of concepts in a simplified form that are further described below in the Detailed Description. This Summary is not intended to identify key features or essential features of the claimed subject matter.

BRIED DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the disclosure. Given the benefit of this disclosure, skilled artisans will recognize the examples provided herein have many useful alternatives that fall within the scope of the disclosure.

DETAILED DESCRIPTION

Figure 1:
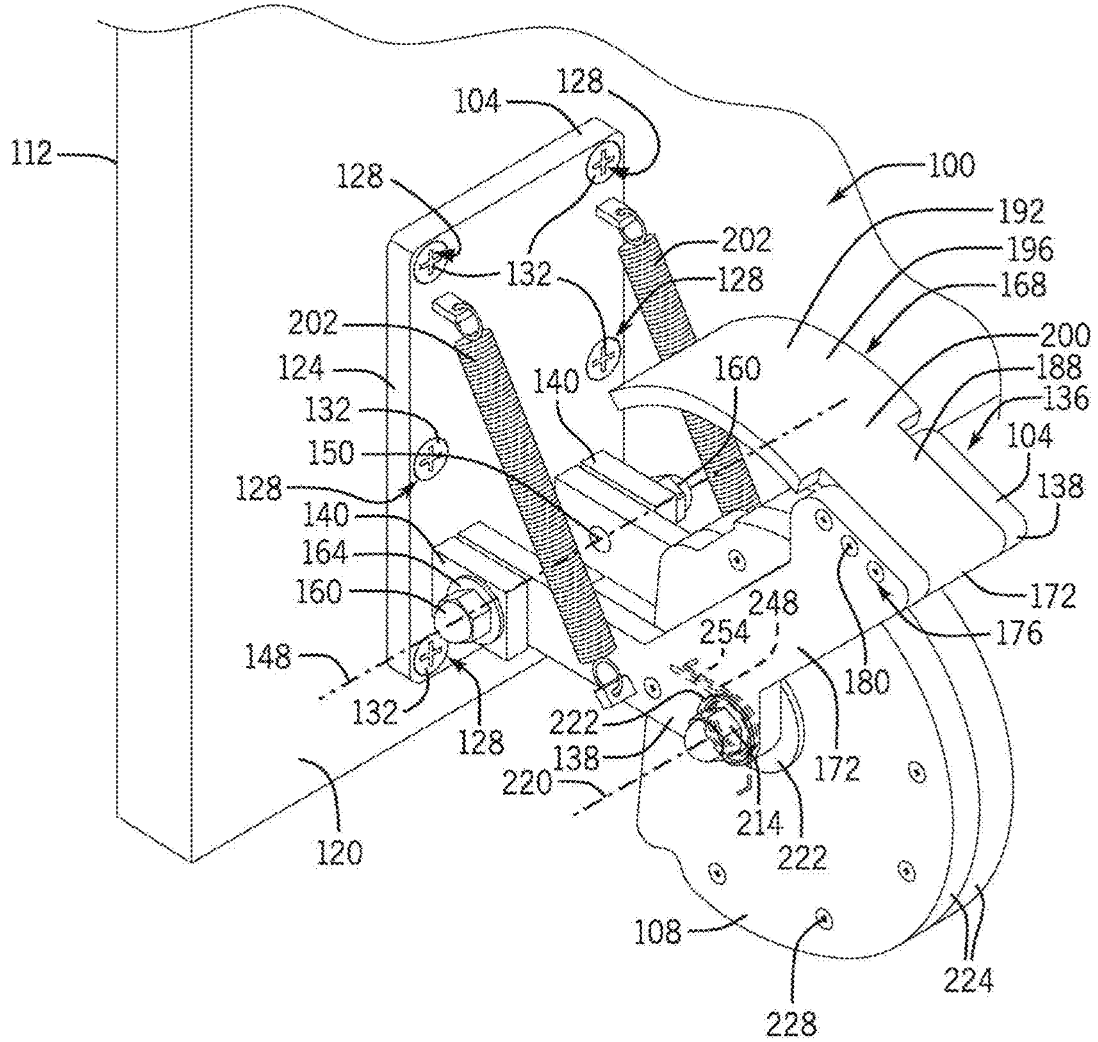
FIG. 1 is an isometric view of an exemplary door opener according to aspects of the disclosure, with the door opener mounted to a door.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having," and variations thereof, herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Likewise, "connected" and "coupled" are not restricted to physical or mechanical connections or couplings unless identified as such. Furthermore, throughout the description, terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

The following discussion is presented to enable a person skilled in the art to make and use embodiments of the disclosure. Given the benefit of this disclosure, various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

As noted above, a need exists for an improved door opener (i.e., a door opening assistance device) that can allow for hands-free opening of a door, while also improving usability. In particular, it is appreciated that a door opener can allow a user to apply a downward force to the door opener, which is then converted into a lateral force by the door opener to open the door. Accordingly, a user can use their own bodyweight to cause and/or assist the door to open. Such door openers can be used on both swinging and sliding doors. Relatedly, such door openers can be configured to provide a force to either push or pull a door open.

Figure 2:
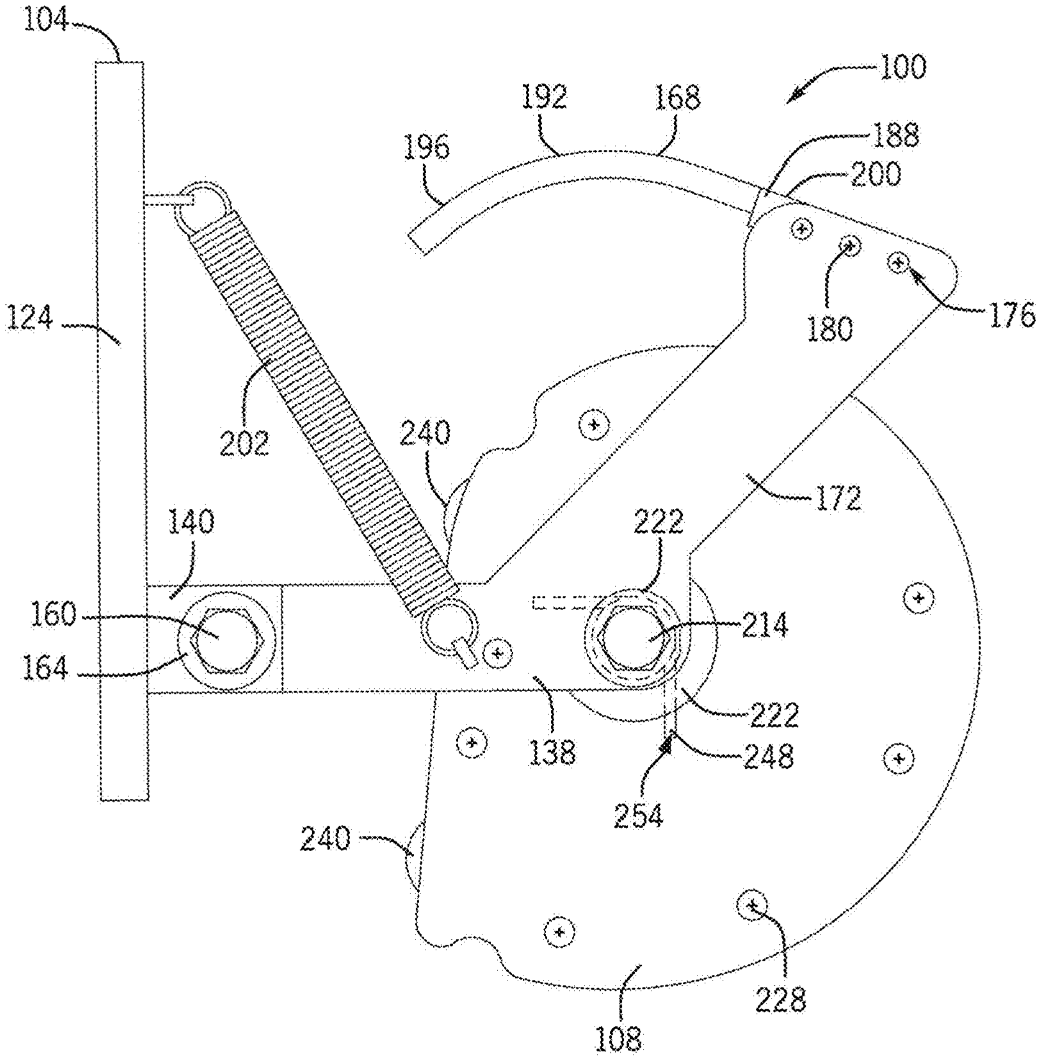
FIG. 2 is a side elevational view of the door opener of FIG. 1.
Figure 3:
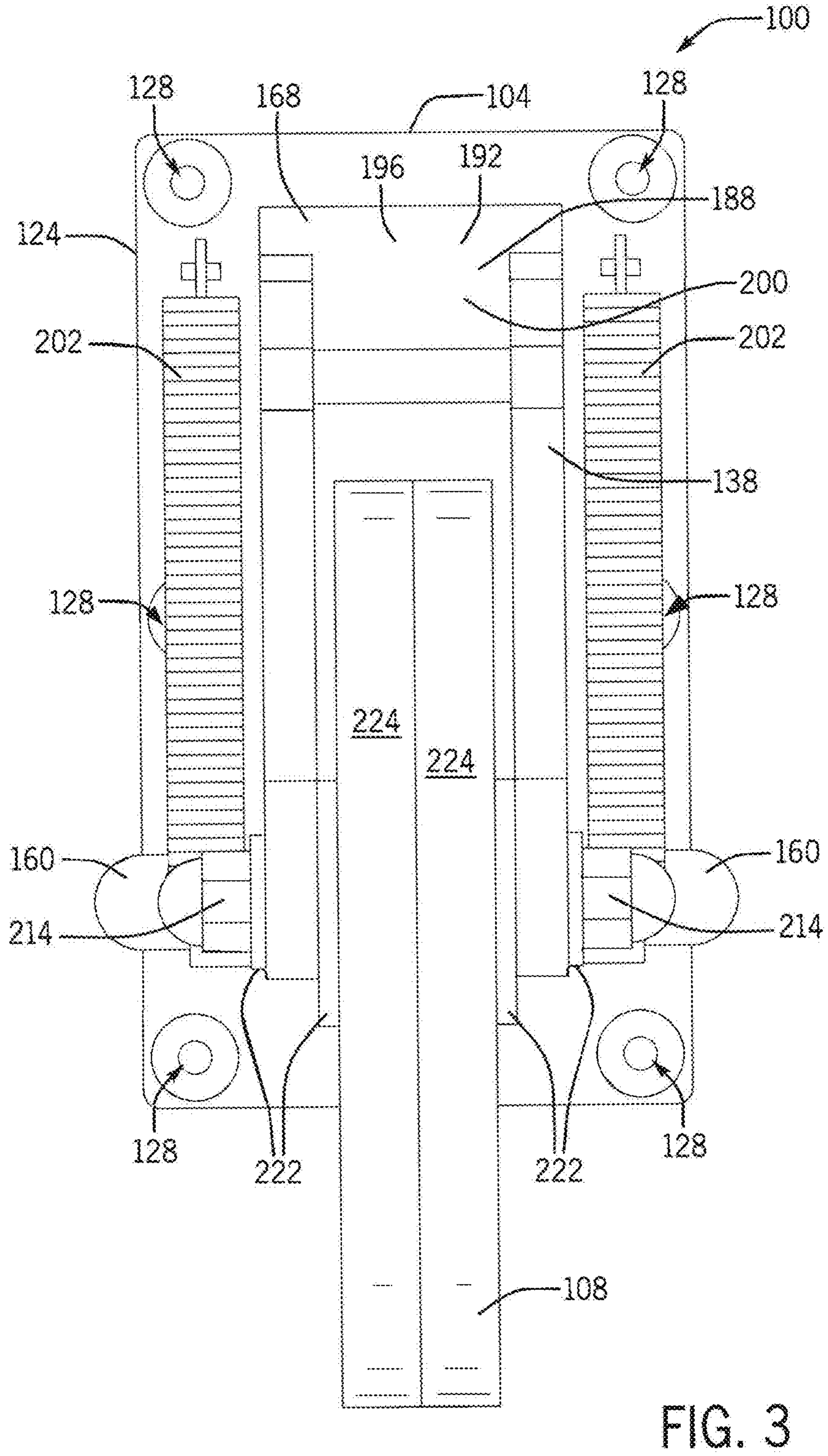
FIG. 3 is a front elevational view the door opener of FIG. 1.
Figure 4:
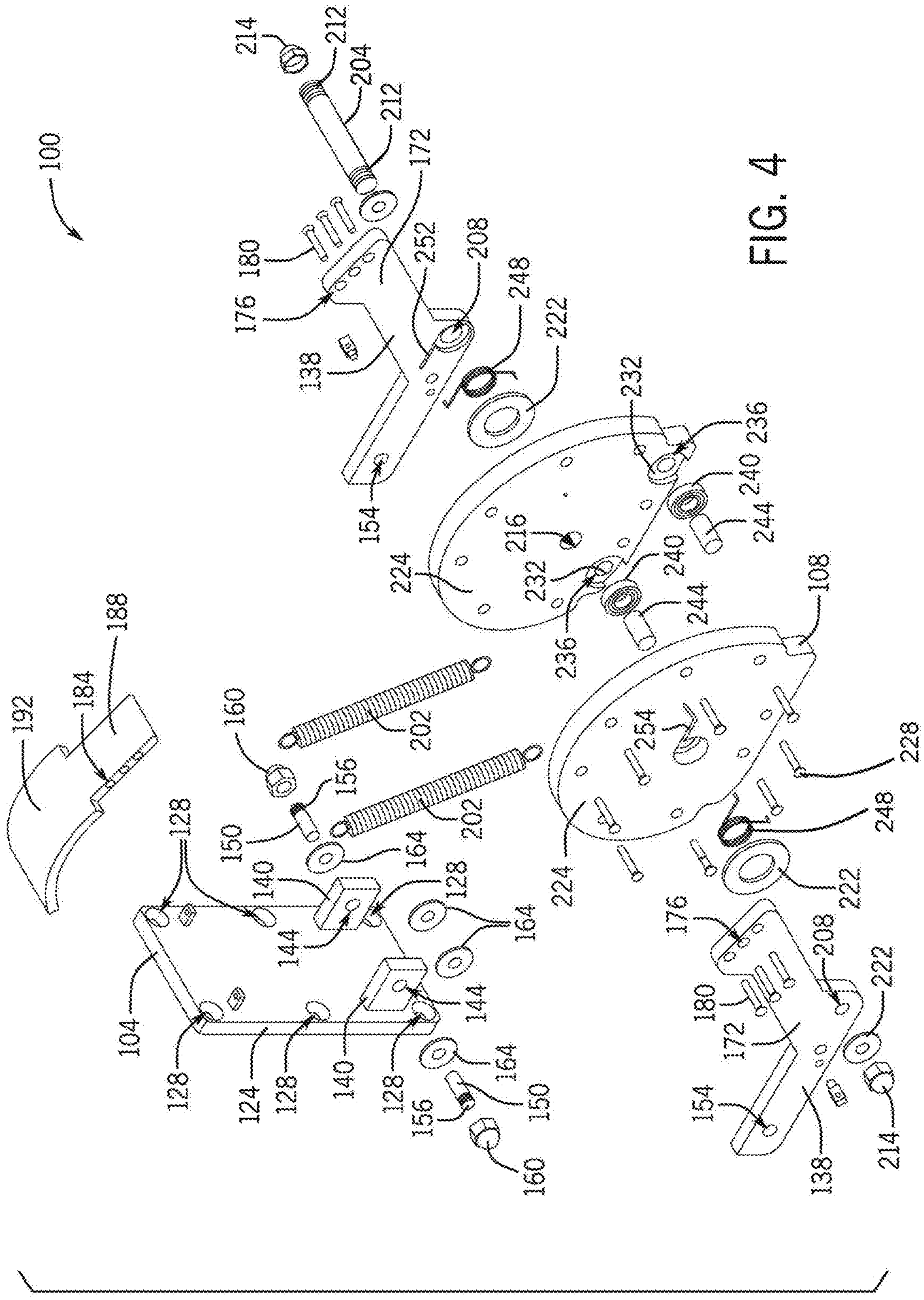
FIG. 4 is an exploded view of the door opener of FIG. 1.

FIGS. 1-3 illustrate an example door opening assistance device for opening a door, configured as a door opener 100. As will be described in greater detail below, the door opener 100 is generally configured to be coupled to a door and to allow a user to advantageously use their own body weight to open the door without having to contact high touch surfaces (e.g., a handle or edge of the door) with their bare hands. In that regard, the door opener 100 is configured as a hands-free door opener, and more specifically, a foot-operated door opener that allows a user to use and take advantage of their own body weight to assist in opening a door. More specifically, the door opener 100 is a mechanical assistance device that does not rely on electricity or another external power source to operate. Accordingly, the door opener 100 can be easily fitted to any door, which can be useful for retrofit applications and can reduce installation costs.

Figure 6:
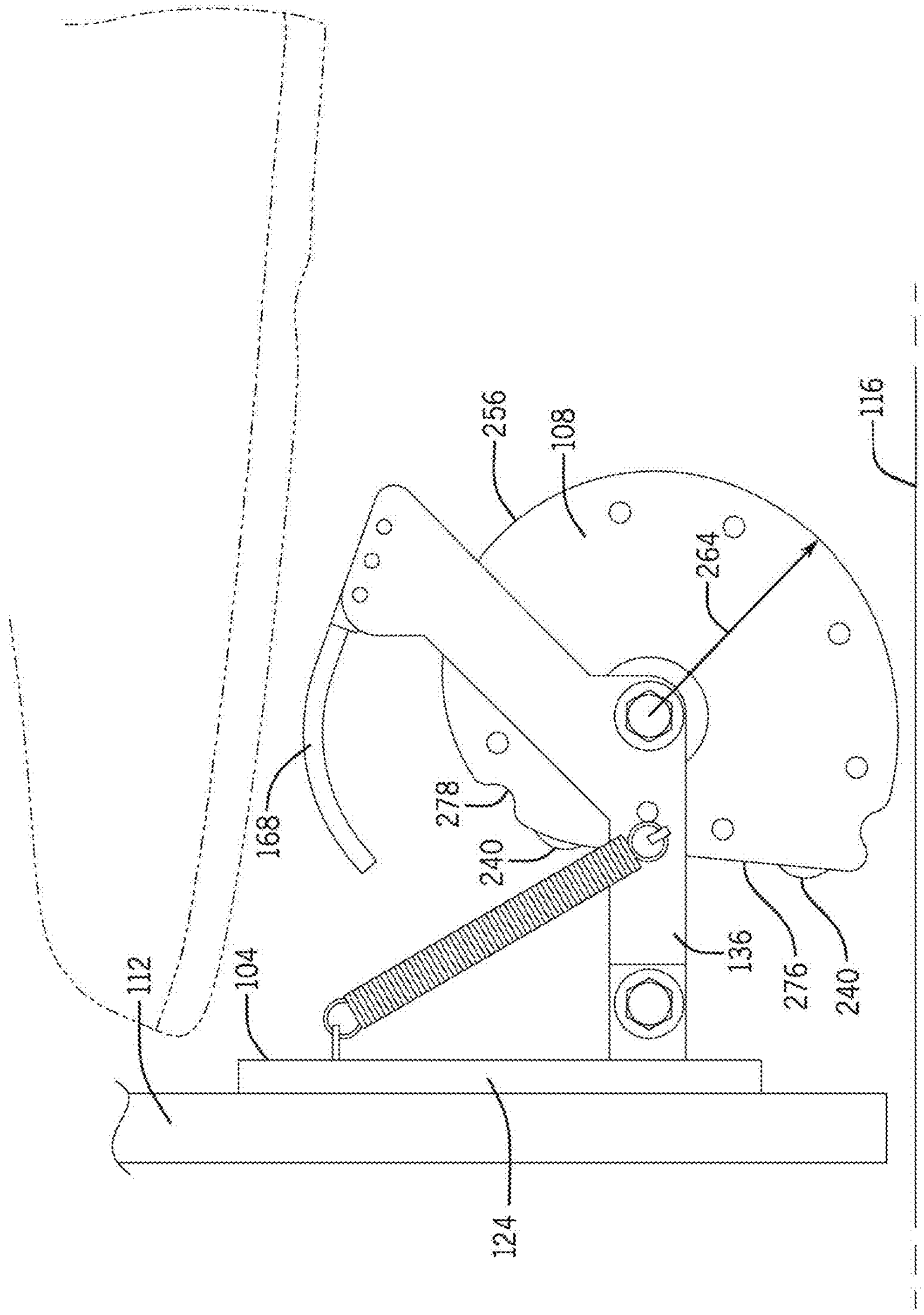
FIG. 6 is a side elevational view of the door opener of FIG. 1, with the door opener in a first, unloaded configuration and the wheel in an initial rotational position.
Figure 7:
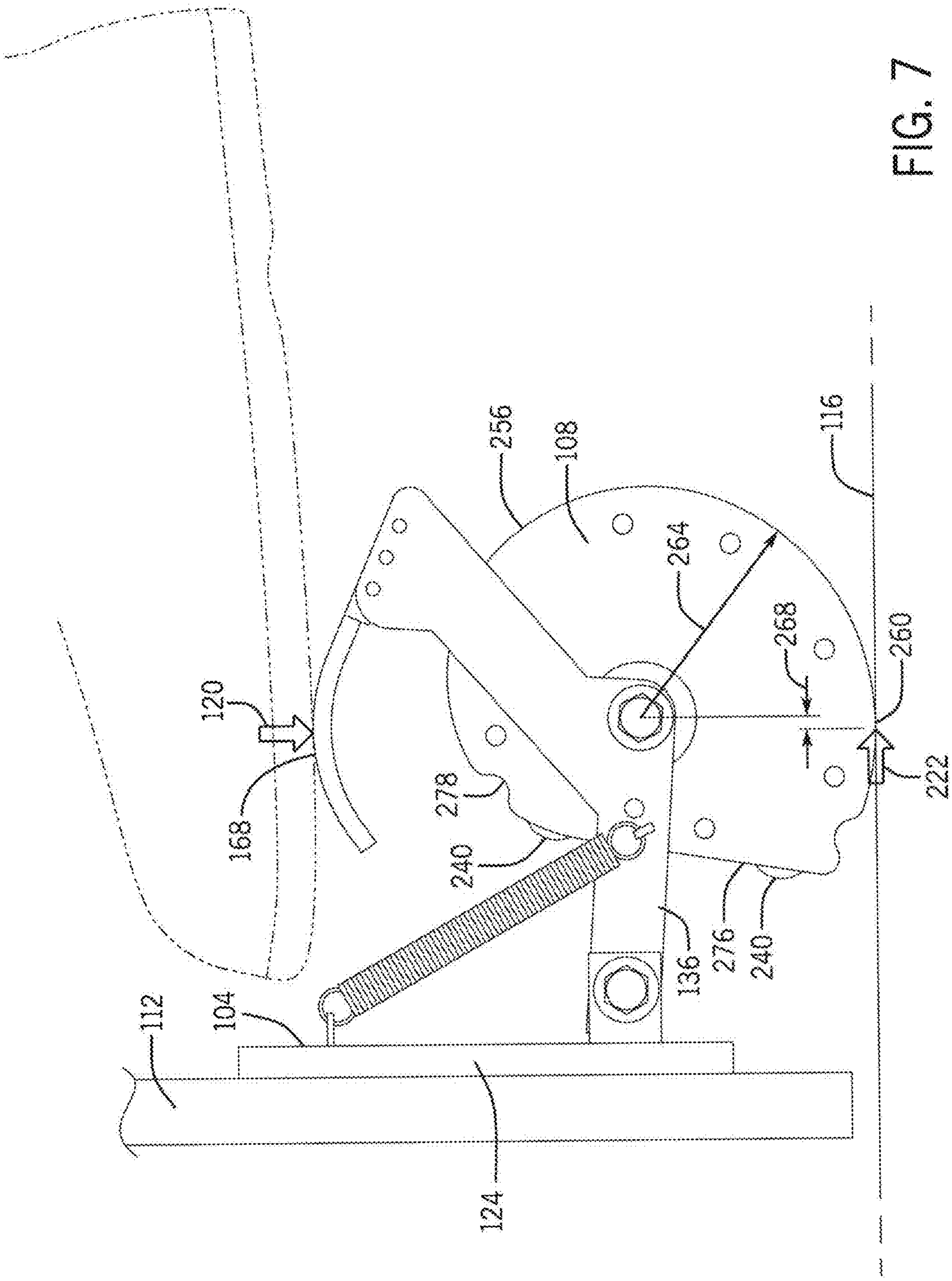
FIG. 7 is a side elevational view of the door opener of FIG. 1, with the door opener in a second, loaded configuration and the wheel in an initial rotational position.

The door opener 100 generally includes a frame 104 that is configured to support a wheel 108. That is, the frame 104 acts as an intermediate body that is coupled between a door 112 and the wheel 108 to support the wheel 108 on the door 112. Put another way, the door 112 is the sole means of support for the door opener 100, directly supporting the frame 104 and indirectly supporting the wheel 108 via the frame 104. The frame 104 can be configured to movably support the wheel 108 so that the wheel 108 can move between a first, unloaded configuration (see FIG. 6) and a second, loaded configuration (see FIGS. 7-9). In the unloaded configuration the frame 104 is configured to support the wheel 108 in an elevated state, wherein the wheel is not in contact with a support surface 116 (e.g., the ground or floor). In the loaded configuration, the wheel 108 is moved downward and into contact with the support surface 116 in response to a downward force 120 (e.g., a force that is directed towards the support surface 116, see FIG. 5) acting on the frame 104. In particular, the downward force 120 can be applied by a foot of a user pressing or stepping onto the frame 104. As will be described in further detail below, continued application of the downward force 120 to the frame 104 in the loaded configuration, in combination with the shape of the wheel 108, causes the wheel 108 to automatically begin rotating, thereby generating a lateral force 122 (see FIG. 5) to open the door 112. Correspondingly, a frame can be made of one or more materials having sufficient strength to withstand any loading, including adverse loading, that may occur, for example, aluminum, steel, and polymers, in particular, fiber-reinforced polymers.

Continuing, the frame 104 generally includes a mounting bracket or base plate 124 that is configured to couple to the door 112. In particular, the base plate 124 can include a plurality of mounting holes 128 that are configured to receive a corresponding plurality of fasteners 132 (e.g. wood screws, metal screws, and self-tapping screws). Each of the plurality of fasteners 132 can be inserted through a corresponding mounting hole 128 to extend through the base plate 124 and into the door 112. Correspondingly, the base plate 124 can be fixedly coupled to the door 112 so that the door opener 100 moves with the door 112 and vice versa. In other embodiments, a base plate can be coupled to a door by other means as known in the art, for example, by an adhesive. Relatedly, a base plate can be mounted at a height above the floor so that a wheel is not in contact with the ground or other support surface when the wheel is in the unloaded configuration. Additionally, a base plate can be arranged on a door so as to obtain an increased mechanical advantage that reduces the lateral force required to open the door. In particular, on a swinging type door, a base plate can be secured along an outer edge of a door that is radially furthest from the door hinges (i.e. an edge opposite the door hinges). More specifically, a base plate can be mounted substantially below a handle of the door (e.g., between the handle and the ground).

Additionally, a frame can further include a support bracket or arm that is configured to rotatably support a wheel. The support bracket or arm can be moveably coupled to a base plate that is secured to a door to allow the wheel to move relative to the base plate and the door between a first, unloaded configuration and a second, loaded configuration. For example, as illustrated, the frame 104 includes a support arm 136 configured as a pivot arm that is pivotally coupled to and extends from the base plate 124. The support arm 136 includes two pivot arms 138 (e.g., a first pivot arm and a second pivot arm) that are pivotally coupled to the base plate 124 along opposing edges of the base plate 124. Each pivot arm 138 is pivotally coupled to a corresponding pivot bracket 140 extending substantially perpendicularly from the base plate 124 (e.g., away from the door 112 and toward the wheel 108). More specifically, each pivot arm 138, is disposed along an interior side of the respective pivot bracket 140 so that a distance between the pivot arms 138 is smaller than a corresponding distance between the pivot brackets 140. As illustrated, the pivot arms 138 are identically shaped, but this may not always be the case and the pivot arms can also be configured differently from one another. Likewise, in other embodiments the support arm may be coupled to and arranged differently on a base plate.

To allow the support arm 136 to pivot relative to the door 112 and the base plate 124, each pivot bracket 140 defines a corresponding pivot hole 144. The pivot holes 144 can be in coaxial alignment with one another to define a pivot axis 148, about which the support arm 136 and the wheel 108 can pivot. In particular, each pivot hole 144 can be configured to rotatably receive a corresponding stub axle 150 (e.g. a pivot axle) extending from the respective pivot arm 138 and through the pivot bracket 140. Each stub axle 150 can be secured at each of its respective ends to prevent the stub axle 150 from dislodging (e.g., by a press-fit, threaded connection, fastener, or a cotter pin). For example, as illustrated, each stub axle 150 is secured in a hole 154 formed in the respective pivot arm 138 (e.g., via a threaded or press-fit connection). Additionally, each stub axle 150 includes a threaded distal end 156 that extends through the pivot hole 144 in the pivot bracket 140, where it is secured with a nut 160 (e.g., an acorn or cap nut). Furthermore, spacers 164 (e.g., washers or bushings) may be provided at each side of the pivot brackets 140. In particular, spacers 164 can be disposed between the nut 160 and the pivot bracket 140 and between the pivot arm 138 and the pivot bracket 140. The spacers 164 can be used to align the pivot arms 138 and help the support arm 136 to pivot freely.

In other embodiments, a support arm may include only a single pivot arm or more than two pivot arms. Additionally, in other embodiments, only a single pivot axle configured as a through axle that extends between one or more pivot brackets. Relatedly, a frame can also be configured differently to permit a wheel to move between an unloaded configuration and a loaded configuration. For example, a frame can be configured to allow linear translation of the wheel between a first, unloaded configuration and a second, loaded configuration. More specifically, a wheel can be supported on a support plate or arm that is coupled to a base plate via one or more linear rails.

To move a wheel from an unloaded configuration to a loaded configuration, a user can apply a force to a frame, and more specifically, a support arm of a door opener. In particular, the force can be a downward force (e.g., a force wherein at least a portion of the force is directed downward, towards the ground or other support surface), which can be applied by a foot of a user. In this way, the user can use their own bodyweight to apply the downward force. Accordingly, a support arm of a frame can sometimes be provided with a foot plate or pedal that is configured to receive a foot of a user. The foot pedal can be coupled to and supported by a support arm so that the downward force supplied by the user is transmitted to the support arm, causing the support arm to move the wheel from the unloaded configuration to the loaded configuration. In that regard, the foot pedal can be supported anywhere on the support arm, for example, a side of the support arm or above the support arm. It may be preferrable to mount the foot pedal so that it does not interfere with the rotation of the wheel in the loaded configuration. Additionally, a foot pedal can be rigidly coupled to the support arm, or in some cases, movably coupled to the support arm.

For example, as illustrated in the figures, the support arm 136 is configured to support a foot pedal 168 above the wheel 108. In that regard, each pivot arm 138 is provided with an extension 172 that extends (e.g., obliquely extends) from the respective pivot arm 138. More specifically, the extensions 172 extend upwardly (e.g., away from the support surface 116) and outwardly (e.g., away from the base plate 124) to provide a user with a large lever arm, giving the user a greater mechanical advantage, which reduces the amount of downward force 120 required to operate the door opener 100. The extensions 172 are provided with a plurality of foot pedal mounting holes 176 (e.g., clearance holes) that are configured to receive a corresponding plurality of fasteners 180. The fasteners 180 pass through the extensions 172 to engage with a corresponding plurality of threaded holes 184 provided in the foot pedal 168. More specifically, the threaded holes 184 can be provided in a mounting tab 188 that extends from a foot-receiving portion 192 of the foot pedal 168. The mounting tab 188 may have a width (e.g., a dimension taken between the pivot arms 138) that is less than a corresponding width of the foot-receiving portion 192. Accordingly, the mounting tab 188 can be received between the pivot arms 138 and the foot-receiving portion 192 can provide a user with a larger surface area on which to engage the foot pedal 168 with their foot. This larger surface area can improve ease of use and make the door opener 100 more comfortable to operate by reducing pressure that is exerted onto a user's foot when they engage the foot pedal 168 to apply the downward force 120.

In some embodiments, a foot-receiving portion of a pedal can be configured to improve and optimize force transfer from the user to the foot pedal. In particular, a foot-receiving portion may have flat portions and/or curved portions, in particular with a pivoting support arm, so that the user is provided with a horizontal surface on which to apply a downward force, no matter the position of the support arm. Similarly, a user can also be provided with a surface that is angled to allow a user to apply a force in a tangential direction relative to a swing path of the support arm, minimizing the force that needs to be applied by the user to move the wheel. For example, as illustrated, the foot-receiving portion 192 of the foot pedal 168 includes a curved portion 196, which extends from a planar portion 200 that includes the mounting tab 188. Accordingly, even as the support arm 136 is pivoted downward, the user is always provided with an optimal surface for applying force to the foot pedal 168. Relatedly, in some embodiments, a foot pedal can be provided with tractive features that can increase grip between a user's foot and the foot pedal. For example, a foot pedal can include knurling or a treaded pattern, or it can include a rubber pad or other similar material with a high coefficient of friction.

In some cases, a support arm or bracket can be configured to return and retain a wheel in a first, unloaded configuration so that the wheel is not in contact with the ground and the door can thereby be opened conventionally (e.g., by a user grabbing a handle). That is, the support arm can be configured to reset the wheel to the unloaded configuration between uses so that the door can be opened again. Accordingly, a frame can include one or more resilient members that are configured to return and retain a wheel in an unloaded configuration. Correspondingly, it is appreciated that a user may have to overcome an opposing force provided by the one or more resilient members to move the wheel from the unloaded configuration to the loaded configuration. For example, as illustrated, the frame 104 can further include first resilient members configured as a pair of tension springs 202. Each tension spring 202 is coupled to and extends between a respective one of the pivot arms 138 and the base plate 124. In other embodiments, the tension springs 202 can be coupled to structures other than the base plate 124, for example, the door 112.

It is appreciated, that each tension spring 202 may be pre-loaded so as to be under a predetermined amount of tension in the unloaded configuration. Correspondingly, a base plate or support arm may include one or more rotation stops (not shown) configured to prevent the support arm 136 and the wheel 108, and any other attached structures, from pivoting upward (i.e., toward the base plate 124 and the door 112) beyond the unloaded configuration. In other embodiments, only one resilient member may be provided, or more than two resilient members may be provided. Relatedly, other types of resilient members can also be provided, for example, gas spring, compression spring, torsion springs, spiral springs, and counterweights.

Additionally, with continued reference to FIGS. 1-4, a support arm can be configured to rotatably couple to and support a wheel of a door opener. In particular, a support arm can include an axle that can be configured to extend between pivot arms or to be cantilevered from a support arm. In the illustrated example, support arm 136 includes an axle 204 that extends between each of the pivot arms 138, so that the axle 204 is supported on each end. More specifically, each pivot arm 138 is provided with a hole 208 configured to allow a threaded end 212 of the axle 204 to pass through the pivot arm 138, where it is secured with a nut 214 (e.g. an acorn or cap nut). In other embodiments, the axle 204 can be secured between the arms differently, for example a press-fit connection or threaded connection provided in the pivot arm 138. In that regard, an axle can be configured as a partially threaded fastener (e.g., a bolt) with a smooth central shaft portion disposed between a threaded end and a head. The fastener can be passed through a clearance or through hole in one of the pivot arms and subsequently threaded into a threaded hole formed in the other pivot arm.

Correspondingly, the wheel 108 includes an axle hole 216 that is configured to rotatably receive the axle 204. The axle hole 216 can define a wheel axis 220. In this way, the wheel 108 is rotatably supported by the axle 204 and can freely rotate about the axle 204 and the wheel axis 220, while also pivoting with the support arm 136 about the pivot axis 148. Relatedly, as illustrated, the wheel 108 is disposed between the pivot arms 138; however, this may not always be the case. Additionally, in some embodiments, a door opener may include a bearing (e.g., a roller bearing or a needle bearing)

or a bushing (not shown) between the axle 204 and the wheel 108 to reduce friction therebetween and to increase longevity of the door opener. Similarly, spacers 222 can be supported on the axle 204 on the sides of each of the pivot arms 138. The spacers 222 can ensure proper alignment of the wheel 108 and can allow the wheel 108 to rotate freely. In that regard, in the illustrated embodiment, spacers 222 are provided between the nuts 214 and the pivot arms 138, and between the wheel 108 and the pivot arms 138.

Relatedly, in some cases, a wheel can be configured as a multi-part wheel. For example, as illustrated, the wheel 108 includes two wheel halves 224 that are configured to be coupled together by a plurality of fasteners 228. Additionally, as will be discussed in greater detail below, each wheel half 224 further defines open-sided recesses 232 that, together, form open cavities 236 that open along an outer perimeter of the wheel 108. Each open cavity 236 is configured to retain a secondary wheel 240 (e.g., a bearing) and corresponding secondary wheel axle 244, which can allow the wheel 108 to move in the loaded configuration, with the wheel 108 in a final rotational position (see FIG. 9), without further rotation. In other embodiments, a wheel can be configured differently. For example, a multi-part wheel may include more or fewer additional recesses, or no recesses at all, or a wheel can be configured as single piece wheel. Likewise, a wheel may include more or less secondary wheels, or no secondary wheels. In that regard, a wheel may include other wear parts, which can be configured to contact a support surface to reduce and/or prevent damage to the wheel. For example, a wheel can include polymer slide pads, to allow the wheel to slide in the loaded configuration with the wheel in a final rotational position. Moreover, a wheel can also be made of one or more materials, for example, polymers, metals, and rubber.

Still referring to FIGS. 1-4, a door opener can be configured to return and retain a wheel in an initial rotational position (e.g., an un-rotated or starting position) when the wheel is in a first, unloaded configuration. That is, the wheel can be configured to be reset to its initial rotational position between uses so that the door can be opened again. Accordingly, a door opener can include one or more resilient members that are configured to return the wheel to the initial rotational position. For example, in the illustrated embodiment, the door opener 100 includes a pair of second resilient members configured as torsion springs 248. Each torsion spring 248 is disposed between the wheel 108 and one of the respective pivot arms 138 to provide a return force or torque that biases the wheel 108 to the initial rotational position. In particular, each torsion spring 248 is retained on one end within a corresponding first channel or recess 252 (only one shown) formed in the pivot arm 138 and at the other end within a corresponding second channel or recess 254 (only one shown) formed in the wheel 108. In other embodiments, other types of resilient members can also be used, for example, a spiral spring.

As mentioned above, the wheel can be configured to automatically rotate when the wheel is in contact with a support surface in a loaded configuration. More specifically, a wheel can define an outer surface extending along a perimeter of the wheel, which is configured to contact the ground as the wheel rotates to open the door. In that regard, at least a portion of the outer surface of the wheel can be a curved surface to allow the wheel to automatically rotate when a downward force is applied to the wheel (e.g., a force that is applied to a foot pedal and transmitted to the wheel via an axle extending through the wheel). That is, the curvature of the curved surface can provide the wheel with a kinetic shape that converts the downward force that rotates the wheel to produce a lateral force that opens the door. Accordingly, the larger the perimeter of the wheel, the greater the opening angle of the door will be. Thus, the size of the wheel can be selected by a manufacturer or installer to allow the door opener to provide assistance over a desired opening angle of a door.

Figure 5:
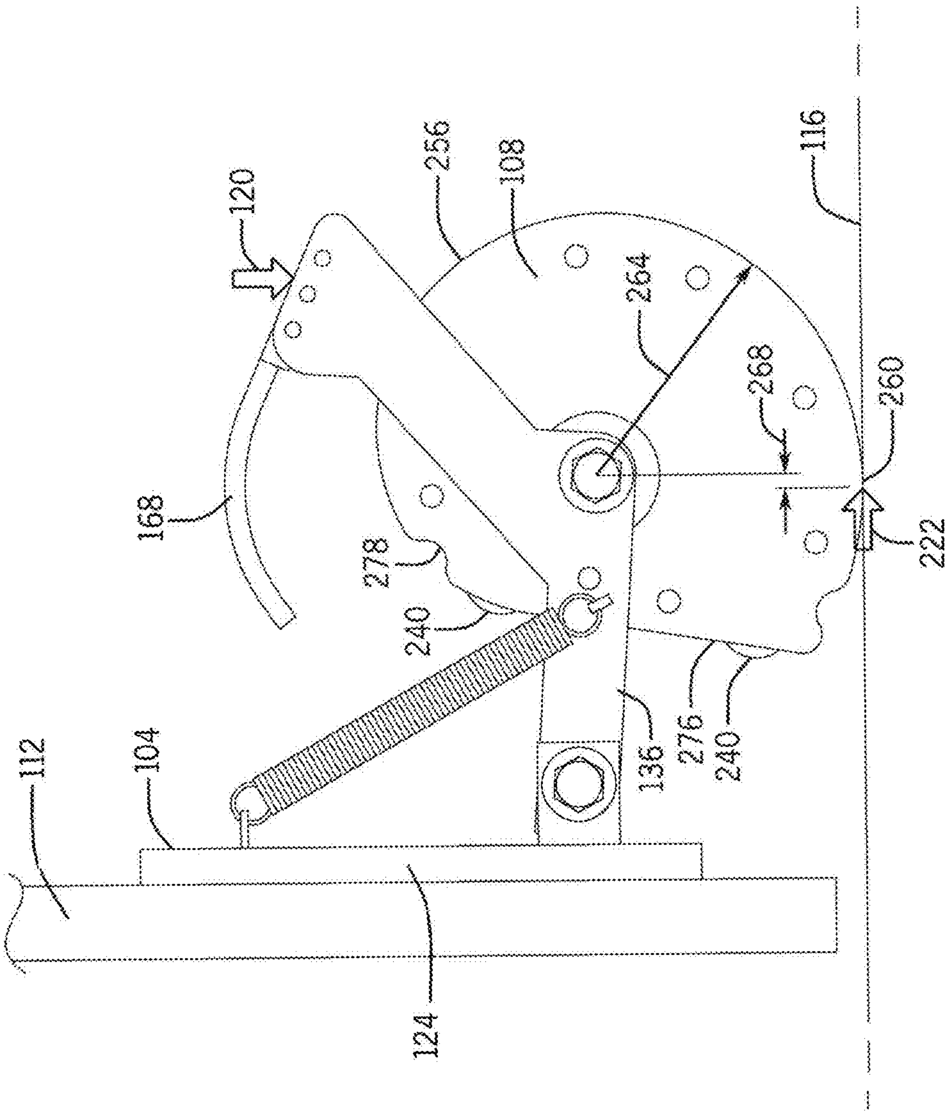
FIG. 5 is a schematic view of the door opener of FIG. 1 illustrating forces that are applied to the wheel during operation of the door opener.

For example, with additional reference to FIG. 5, the wheel 108 defines an outer perimeter having a curved portion 256 (e.g., a curved outer surface), which contacts the support surface 116 at a contact point 260 in the loaded configuration. In general, a radius 264 of the curved outer portion 256 becomes smaller moving away (e.g., clockwise or counter-clockwise) from the contact point 260. In the illustrated example, the radius 264 of the curved portion 256 becomes smaller moving counter-clockwise so as to pull the door 112 open. Conversely, if the radius 264 of the curved portion 256 became smaller moving clockwise, the door 112 would be pushed open. In the illustrated embodiment, the radius 264 can vary as a function of an angular position of the wheel 108. In particular, the radius 264 (R) can be defined by the following equation, where θ is the angular position of the radius 264 along the wheel 108 and S is a scaling factor:

$$R(\theta)_0^{2\pi}=S*e^{0.125(\theta-cos(\theta))+ln(1.5)}$$

In one embodiment, the scaling factor can range between approximately 1.2 and approximately 0.7, and more specifically, can be approximately 0.9. In other embodiments, a largest value of the radius 264 may be approximately 5 inches and a smallest value of the radius 264 may be approximately 1 inch. The scaling factor will increase or decrease the size of the shape, but will not affect the generated force. The distance travelled will increase with a larger size and decrease with a smaller size. In other embodiments, a curved portion of a wheel can be shaped differently, for example, as an Archimedean spiral or according to a different equation. In either case, the shape of the curved portion 256 results in the contact point 260 being laterally offset by an offset distance 268 from the wheel axis 220, so that the contact point 260 is not directly below the wheel axis 220, as shown in FIG. 5. The offset distance 268 may range between 0.1 inches and 0.5 inches with door opener 100 in the loaded configuration and the wheel 108 in the initial rotational position, and preferably between 0.1 inches and 0.3 inches, or 0.15 inches and 0.25 inches, or approximately 0.2 inches.

As a result of the offset distance 268 and the reduction in the radius 264, the curved portion 256 effectively acts as a sloped surface, which causes the wheel 108 to automatically rotate to roll away from the door 112 when the downward force 120 is applied. That is, with the wheel 108 in the loaded configuration and in an initial rotational position (see FIG. 7), the continued application of downward force 120 causes the wheel 108 to rotate away from the initial rotational position (see FIG. 8), effectively moving the contact point 260 along the curved portion 256. The rotation of the wheel 108 thereby generates the lateral force 122 that opens the door 112. It is appreciated that the lateral force 122 must be sufficiently high to overcome the inertia of the door 112 and any friction or other resistive forces associated with the movement of the door 112. In that regard, the resultant lateral force 122 ($F_x$) is a function of the downward force 120 ($F_y$), as defined by the following equation:

$$F_x=F_y\sin(\theta)+F_y$$

In some embodiments, an outer surface of a wheel, in particular, a curved portion of a wheel, can include a coating or outer layer of a high-friction material (e.g., a rubber or polymeric compound) to increase traction between the wheel and a support surface. Accordingly, the high-friction material can improve force transfer between the wheel and the ground so that the wheel does not slip against the support surface. Relatedly, the downward force can also help to improve traction between the wheel and the support surface.

Additionally, a door opener can include a damper (not shown) to control the rotation of a wheel. That is, a damper can be configured to provide a resistive force to limit or reduce the rotational speed of the wheel. Such dampers can be unidirectional dampers that control the rotation of the wheel in one direction, while allowing free or uninhibited rotation in the opposite direction. Accordingly, the rotational speed of the wheel can be limited when a downward force is applied to rotate the wheel away from the initial rotational position (i.e., when opening the door), while allowing the wheel to quickly reattain the initial rotational position when a downward force is removed.

In some cases, a perimeter of a wheel can also be provided with a flattened portion which is configured to contact a support surface once the wheel has rotated beyond a curved portion. The flattened portion can ensure that the wheel does not over rotate, such that a radius of the wheel begins to increase as the wheel rotates. In this way, the flattened portion can act as a physical rotation stop for the wheel. Additionally, the flattened portion can be configured to allow the wheel to move (e.g., slide or otherwise translate) with the door, without further rotation of the wheel. In this way, if necessary, a user may continue to open the door by applying a lateral force to the foot pedal to increase an opening angle of a door even further. For example, in the illustrated non-limiting example, the wheel 108 defines a flattened portion 276 (e.g. a generally flattened portion) that is configured to face the support surface 116 once the wheel 108 has rotated beyond the curved portion 256 to a final rotational position (see FIG. 9). Accordingly, as discussed above, when the flattened portion 276 faces the support surface 116, the secondary wheels 240 can contact the support surface 116 instead of the wheel 108 itself. Thus, if a user were to continue opening the door 112 with the wheel 108 in the final rotational position, the secondary wheels 240 can freely rotate to allow the wheel 108 to translate with the door 112 without further rotation. Relatedly, in some cases, a wheel 108 may include an indent 278 disposed between the curved portion 256 and the flattened portion 276. The indent 278 can provide a physical indication to a user that the wheel 108 is transitioning from the curved portion 188 to the flattened portion 276.

Referring now to FIGS. 6-10, a method 300 of opening a door using a door opener, in particular the door opener 100, is illustrated. The method 300 includes the step 304, wherein a downward force 120 is applied to the door opener 100 in the unloaded configuration (see FIG. 6) to move the door opener 100 into the loaded configuration (see FIG. 7) so that the wheel 108 contacts the support surface 116. More specifically, a user can apply the downward force 120 to the foot pedal 168 that is supported on the support arm 136. Since the support arm 136 is moveably (e.g. pivotally) coupled to the base plate 124, the support arm 136 moves downward (e.g., by pivoting about the pivot axis 148) toward the support surface 116. Correspondingly, because the support arm 136 rotatably supports the wheel 108, the wheel 108 moves with the support arm 136. The contact of the wheel 108 with the support surface 116 stops the support arm 136 from moving further downward. At step 304, the wheel 108 is in an initial rotational position, wherein the contact point 260 between the wheel 108 at the support surface 116 is along the curved portion 256 of the wheel 108. More specifically, in the initial rotational position, the contact point 260 is proximate a portion of the curved portion 256 where the radius 264 of the curved portion 256 is largest.

Figure 8:
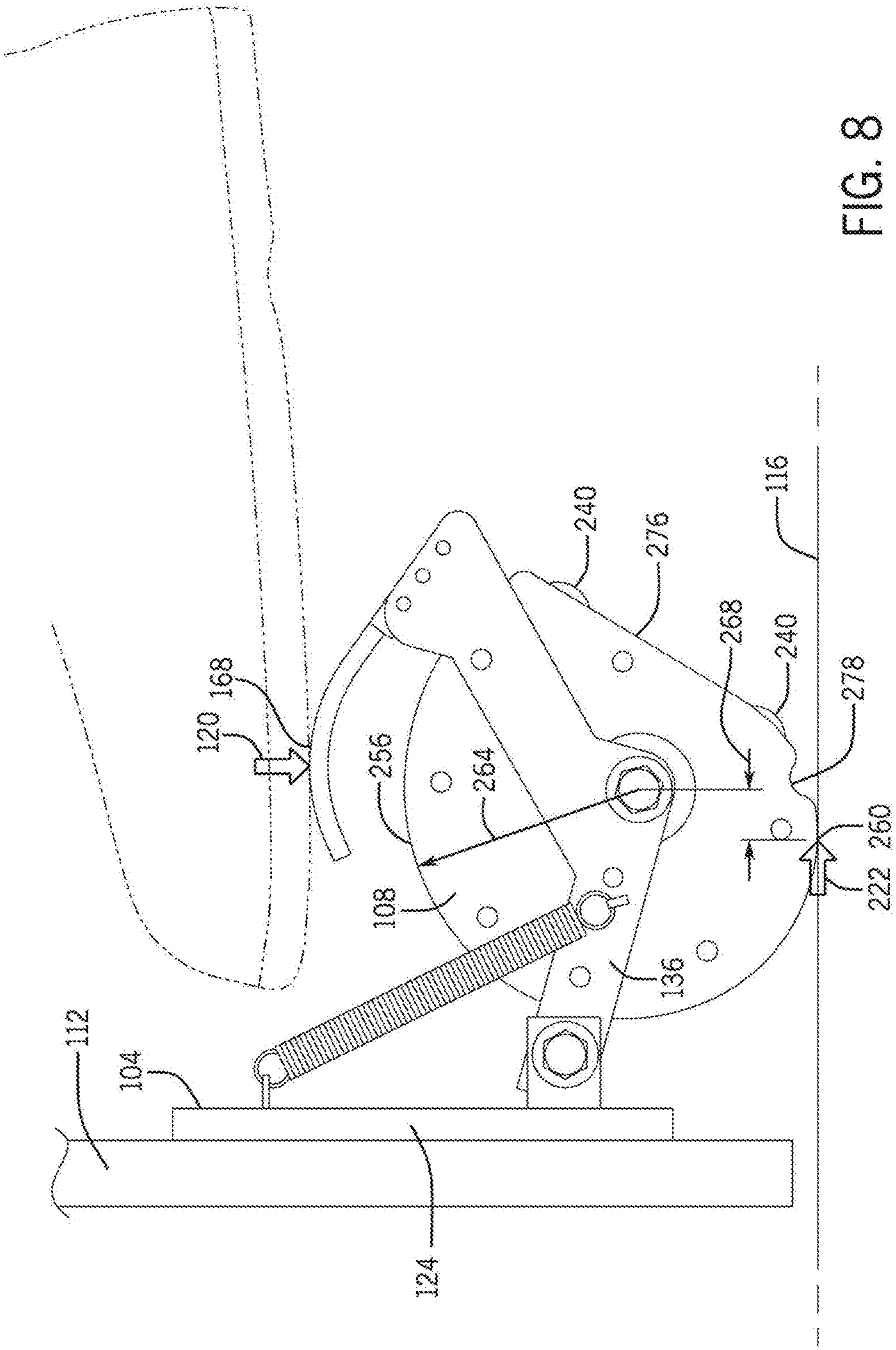
FIG. 8 is a side elevational view of the door opener of FIG. 1, with the door opener in the loaded configuration and the wheel rotated away from the initial rotational position.
Figure 9:
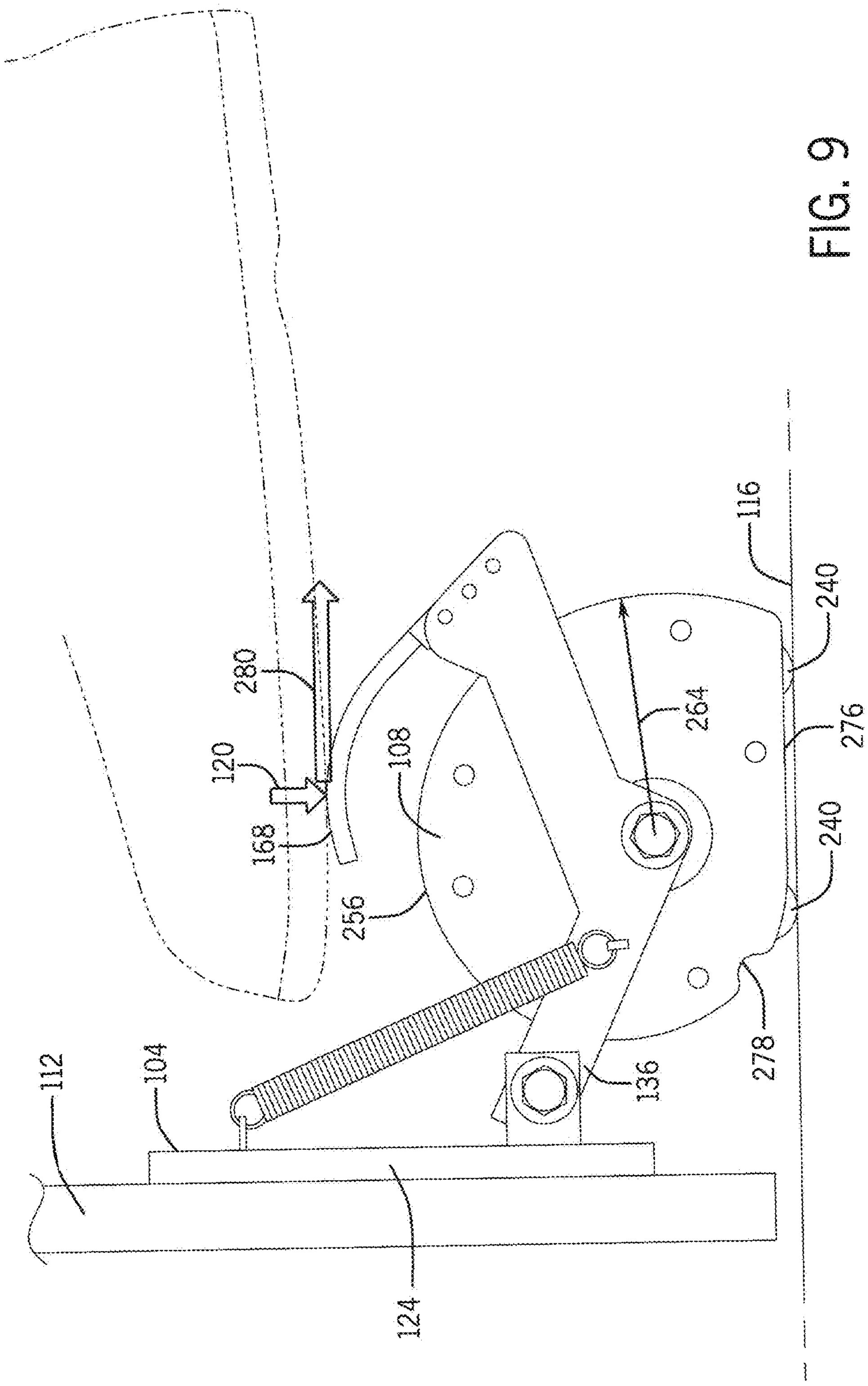
FIG. 9 is a side elevational view of the door opener of FIG. 1, with the door opener in the loaded configuration and the wheel in a final rotational position.
Figure 10:
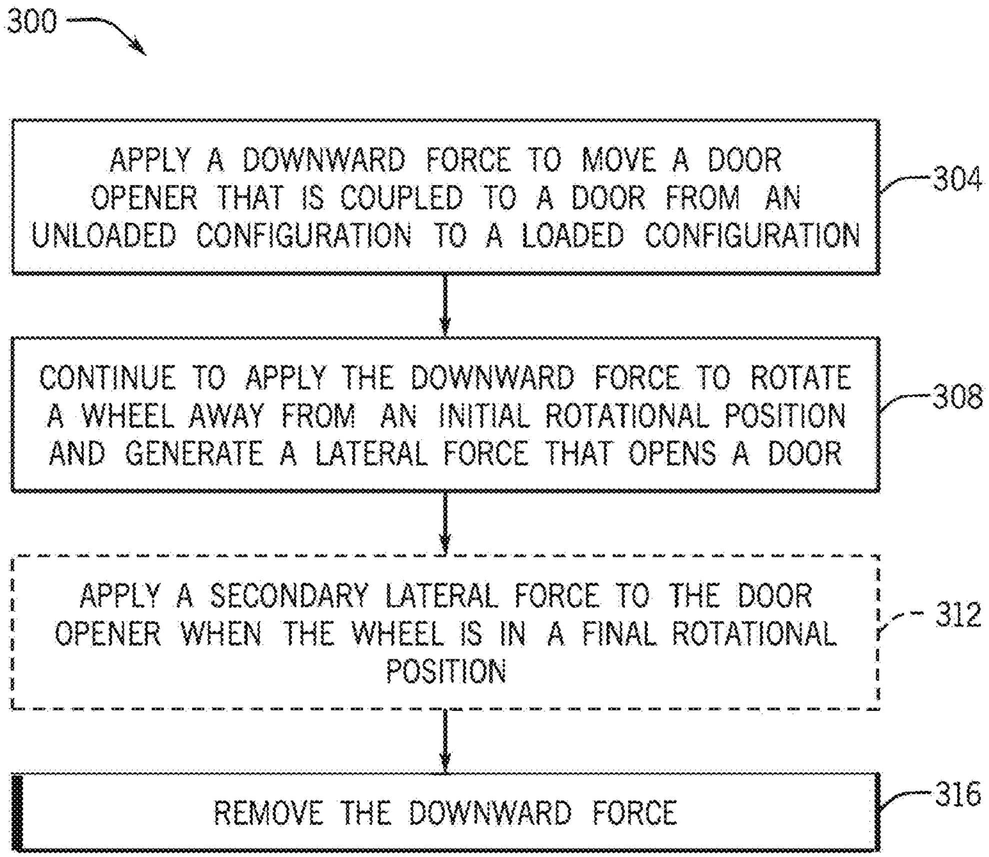
FIG. 10 is a schematic illustration of a method of opening a door using a door opener according to aspects of the disclosure.

At step 308, the downward force 120 is continuously applied to the door opener 100 (e.g., the foot pedal 168) to rotate the wheel 108 away from the initial rotational position in the loaded configuration (see FIG. 8). That is, since the wheel 108 is configured as a kinetic shape, wherein the radius 264 becomes smaller moving along the curved portion 256 and the contact point is laterally offset and not directly below the wheel axis 220, the curved portion 256 effectively acts as a sloped surface that causes the wheel 108 to automatically rotate. This resulting motion is similar to a circular wheel rolling down a hill except that the slope is attached to the wheel. Accordingly, the wheel 108 converts or translates the downward force 120 supplied by the user into the lateral force 122, which causes the door 112 to open (e.g., to swing or slide away from a door frame). The wheel 108 will continuously apply the lateral force 122 to the door 112 as the wheel 108 rotates along the curved portion 256, thereby assisting the user in opening the door 112. In this way, the user can use their own weight to assist in opening the door 112. In some cases, the downward force 120 may be increased during step 308.

In some cases, the method 300 may optionally include the step 312 of applying a secondary lateral force to the door opener 100. In particular, the secondary lateral force can be applied once the wheel 108 has rotated to a final rotational position. In this way, the user can continue to open the door 112 by contacting only the door opener 100 and not the door 112 itself.

Additionally, the method 300 can further include the step 316 of releasing or removing the downward force 120, for example, by a user removing their foot from being in contact with the foot pedal 168. With the downward force 120 removed, the door opener 100 can move to reattain the unloaded configuration of FIG. 6, and the wheel 108 can also reattain the initial rotation position of FIGS. 6 and 7. In particular, the tension springs 202 pull on and move (e.g., pivot) the support arm 136 to move the door opener 100 from the loaded configuration to the unloaded configuration. At the same time, if the wheel 108 is rotated away from the initial rotational position, the torsion springs 248 will apply a torque to the wheel 108 to rotate the wheel 108 back to the initial rotational position.

I claim:

1. A door opener for a door, the door opener comprising:

a frame configured to couple to the door; and a wheel rotatably supported by the frame, at least a portion of the wheel having a kinetic shape that is configured to convert a downward force applied to the frame by a user into a lateral force to open the door, the kinetic shape having a radius that varies relative to an axis of the wheel so that the wheel defines an outer perimeter surface that includes a curved portion and a flat portion and is configured to contact a support surface.

2. The door opener of claim 1, wherein the wheel is configured to move relative to the frame between an unloaded configuration, in which the wheel is elevated above the support surface, and a loaded configuration, in which the wheel is in contact with the support surface.

3. The door opener of claim 2, wherein, the downward force causes the wheel to move between the unloaded configuration and the loaded configuration, and to rotate in the loaded configuration to open the door.

4. The door opener of claim 2, wherein the frame includes a base plate configured to couple to the door and a support arm movably coupled to the base plate, the support arm being configured to rotatably support the wheel so that the wheel moves with the support arm between the unloaded configuration and the loaded configuration.

5. The door opener of claim 4, wherein the support arm is pivotally coupled to the base plate.

6. The door opener of claim 4, wherein the frame further includes a foot pedal coupled to the support arm, the foot pedal being configured to support a foot of the user to allow the user to apply the downward force.

7. The door opener of claim 4, wherein the frame further includes a first resilient member extending between the support arm and the base plate, the first resilient member being configured to move the wheel from the loaded configuration to the unloaded configuration when the downward force is removed.

8. The door opener of claim 7, wherein the first resilient member is configured as a tension spring.

9. The door opener of claim 4, wherein the support arm includes an axle that is received by the wheel and the wheel rotates about the axle.

10. The door opener of claim 9, further including a second resilient member that extends between the support arm and the wheel, the second resilient member being configured to rotate and retain the wheel in an initial rotational position when the wheel is in the unloaded configuration.

11. The door opener of claim 10, wherein the second resilient member is configured as a torsion spring.

12. The door opener of claim 1, wherein the curved portion of the wheel is shaped as an Archimedes spiral.

13. A door opening assistance device for opening a door, the door opening assistance device comprising:

a base plate configured to couple to the door;

a support arm pivotally coupled to the base plate;

a foot pedal rigidly coupled to the support arm; and a wheel rotatably supported by the support arm and configured to pivot with the support arm relative to the base plate between an unloaded configuration, in which the wheel is elevated above a support surface, and a loaded configuration, in which the wheel is in contact with the support surface along an outer perimeter surface that includes a curved portion and a flat portion, the curved portion having a radius that varies relative to an axis of the wheel so that the wheel rotates in the loaded configuration in response to a downward force applied by a user to open the door, the wheel further including a secondary wheel that is coupled to the wheel at the flat portion.

14. The door opening assistance device of claim 13, wherein the downward force applied by the user causes the support arm to pivot from the unloaded configuration to the loaded configuration.

15. A method of opening a door using a door opening assistance device, the method comprising the steps of:

applying a downward force to a foot pedal of the door opening assistance device that is coupled to the door and is configured to move a wheel from an unloaded configuration, in which the wheel is elevated above a flat support surface, to a loaded configuration, in which the wheel is in contact with the flat support surface in an initial rotational position, and in which at least a portion of the wheel has a kinetic shape that is configured to convert the downward force applied to the foot pedal by a user into a lateral force to open the door, the kinetic shape having a radius that varies relative to an axis of the wheel so that the wheel defines an outer perimeter surface that includes a curved portion and a flat portion and is configured to engage with the flat support surface along the curved portion and the flat portion;

continuing to apply the downward force to cause the wheel to rotate away from the initial rotational position along a curved surface of the wheel, the rotation of the wheel resulting in the lateral force that opens the door.

16. The method of claim 15, further comprising the step of applying a secondary lateral force to the foot pedal to continue opening the door once the wheel has rotated to a final rotational position, in which in the flat portion is engaged with the flat support surface.

17. The method of claim 16, wherein the wheel stops rotating after reaching the final rotational position.

18. The method of claim 15, further comprising the step of removing the downward force to allow the wheel to move back to the unloaded configuration and to rotate back to the initial rotational position.

19. The door opener of claim 1, wherein the outer perimeter surface of the wheel includes an indent between the curved portion and the flat portion.

20. The door opener of claim 1, wherein the wheel includes a secondary wheel that is coupled to the wheel at the flat portion.

* * * * *